United States Patent
Deforet et al.

(10) Patent No.: US 11,518,534 B2
(45) Date of Patent: Dec. 6, 2022

(54) FRONT ENGINE ATTACHMENT SYSTEM FOR AN AIRCRAFT ENGINE, HAVING A BEAM MADE IN THREE PARTS

(71) Applicant: Airbus Operations SAS, Toulouse (FR)

(72) Inventors: Thomas Deforet, Toulouse (FR); Rémi Lansiaux, Toulouse (FR); Olivier Dubois, Toulouse (FR); Anthony Mertes, Toulouse (FR); Jacky Puech, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 259 days.

(21) Appl. No.: 16/878,034

(22) Filed: May 19, 2020

(65) Prior Publication Data

US 2020/0369394 A1 Nov. 26, 2020

(30) Foreign Application Priority Data

May 21, 2019 (FR) ...................................... 1905341

(51) Int. Cl.
*B64D 27/26* (2006.01)

(52) U.S. Cl.
CPC ........ *B64D 27/26* (2013.01); *B64D 2027/266* (2013.01)

(58) Field of Classification Search
CPC ........................... B64D 27/26; B64D 2027/266
See application file for complete search history.

(56) References Cited

U.S. PATENT DOCUMENTS

| 2009/0032673 A1 | 2/2009 | Dron et al. |
| 2015/0197341 A1* | 7/2015 | Ewens ...................... B64F 5/40 244/54 |

FOREIGN PATENT DOCUMENTS

| EP | 1982915 A1 | 10/2008 | |
| EP | 1928740 B1 * | 2/2010 | ............. B64D 27/26 |

OTHER PUBLICATIONS

French Search Report; priority document.

* cited by examiner

*Primary Examiner* — Timothy D Collins
*Assistant Examiner* — Eric Acosta
(74) *Attorney, Agent, or Firm* — Greer, Burns & Crain, Ltd.

(57) ABSTRACT

A front engine attachment system for an engine of an aircraft, the front engine attachment system having an engine pylon having, in its front part, a frontal part having an attachment wall with a front face, and a front engine attachment having a beam, which is fastened to the front face and to which a link rod is fastened on either side of a median plane. Each link rod is fastened to the beam in an articulated manner by at least one first connection point and is configured to be fastened to the engine in an articulated manner by at least one second connection point. The beam is made up of front, intermediate and rear plates. The rear plate is pressed against the front face. The front plate is disposed in front of the rear plate. The intermediate plate is disposed between the front plate and the rear plate.

3 Claims, 2 Drawing Sheets

FRONT ENGINE ATTACHMENT SYSTEM FOR AN AIRCRAFT ENGINE, HAVING A BEAM MADE IN THREE PARTS

CROSS-REFERENCES TO RELATED APPLICATIONS

This application claims the benefit of the French patent application No. 1905341 filed on May 21, 2019, the entire disclosures of which are incorporated herein by way of reference.

FIELD OF THE INVENTION

The present invention relates to a front engine attachment system for an aircraft engine, and to an aircraft having at least one such front engine attachment.

BACKGROUND OF THE INVENTION

An aircraft conventionally has at least one engine, in particular a jet engine. Beneath each wing, and for each engine, the aircraft has an engine pylon that is fastened to the structure of the wing and extends below the wing, and the engine is suspended beneath the engine pylon.

The engine is fastened to the engine pylon via an engine attachment system comprising a front engine attachment and a rear engine attachment.

The front engine attachment has, for example, a beam that is fastened to a front face of the engine pylon and two link rods that are fastened between the beam and a front casing of the engine.

Each link rod and the beam define, in combination, a primary load path between the engine and the engine pylon, so as to withstand the loads of the engine under normal operating conditions of the engine. Each link rod is equipped with ball joints that are made up of two cut-off and paired balls.

Such a beam is a solid component, obtained by machining a component obtained by forging. The method for obtaining this beam is relatively long and complex.

Although such a beam is satisfactory from the point of view of its use, it is necessary to find a different architecture so as to make its manufacture and implementation easier.

SUMMARY OF THE INVENTION

An object of the present invention is to propose a front engine attachment system of which the beam is in three parts so as to be easier to produce.

To this end, a front engine attachment system configured to be fixed to an engine of an aircraft is proposed, the front engine attachment system having:

an engine pylon having, in its front part, a frontal part having an attachment wall that has a front face, and a front engine attachment having a beam, which is fastened to the front face and to which a link rod is fastened on either side of a median plane, wherein each link rod is fastened to the beam in an articulated manner by at least one first connection point and is intended to be fastened to the engine in an articulated manner by at least one second connection point, wherein the beam is made up of a front plate, an intermediate plate and a rear plate, wherein the rear plate is pressed against the front face, wherein the front plate is disposed in front of the rear plate, and wherein the intermediate plate is disposed between the front plate and the rear plate, wherein each first connection point between the beam and a link rod takes the form of a clevis created in the beam, wherein one wall of the clevis is made up of an extension of the front plate, and wherein the other wall of the clevis is made up of an extension of the rear plate.

Such a front engine attachment system thus has a beam in three parts. Each of these three parts can thus be made from a component that is less heavy and easier to produce.

Advantageously, the fastening of the beam to the front face of the attachment wall is realized with the aid of bolts, and each bolt passes through a bore in the attachment wall, a bore in the rear plate, a bore in the intermediate plate and a bore in the front plate.

Advantageously, the front engine attachment system has, for each link rod, a backup safety fastening point that is activated in the event of failure of a primary load path and creates an auxiliary load path between the engine and the engine pylon, each backup safety fastening point is made up of a clevis provided in the engine and a pin that is fitted into bores in the clevis and passes through a bore in the beam, the diameter of which is greater than the diameter of the pin, and the bore in the beam is formed by a bore through the intermediate plate.

The invention also proposes an aircraft having a structure, an engine and a front engine attachment system according to one of the preceding variants, wherein the engine pylon is fastened to the structure, and wherein a front part of the engine is fastened to the at least one second connection point.

BRIEF DESCRIPTION OF THE DRAWINGS

The abovementioned features of the invention, along with others, will become more clearly apparent on reading the following description of an exemplary embodiment, the description being given with reference to the appended drawings, in which.

DETAILED DESCRIPTION OF THE PREFERRED EMBODIMENTS

Figure 1:
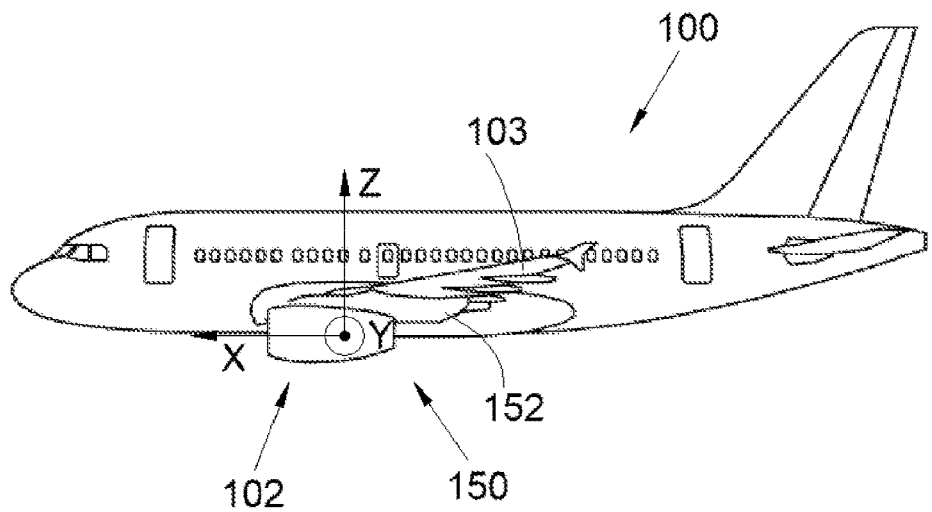
FIG. 1 is a side view of an aircraft according to the invention.

In the following description, terms relating to a position are considered in relation to an aircraft in a position of forward movement, i.e., as shown in FIG. 1.

FIG. 1 shows an aircraft 100, which has an engine 102, in particular a jet engine.

In the following description, and by convention, the X direction is the longitudinal direction of the engine 102, with positive orientation in the direction of forward movement of the aircraft 100, the Y direction is the transverse direction of the engine 102, which is horizontal when the aircraft is on the ground, and the Z direction is the vertical direction or vertical height when the aircraft is on the ground, these three directions X, Y and Z being mutually orthogonal.

In the embodiment of the invention that is shown in FIG. 1, the aircraft 100 has an engine 102 beneath each wing 103, but it is possible to provide a plurality of engines beneath each wing 103.

Beneath each wing 103, and for each engine 102, the aircraft 100 has a front engine attachment system 150 that is fastened to the structure of the wing 103 and extends beneath the wing 103 and supports the front part of the engine 102.

Figure 2:
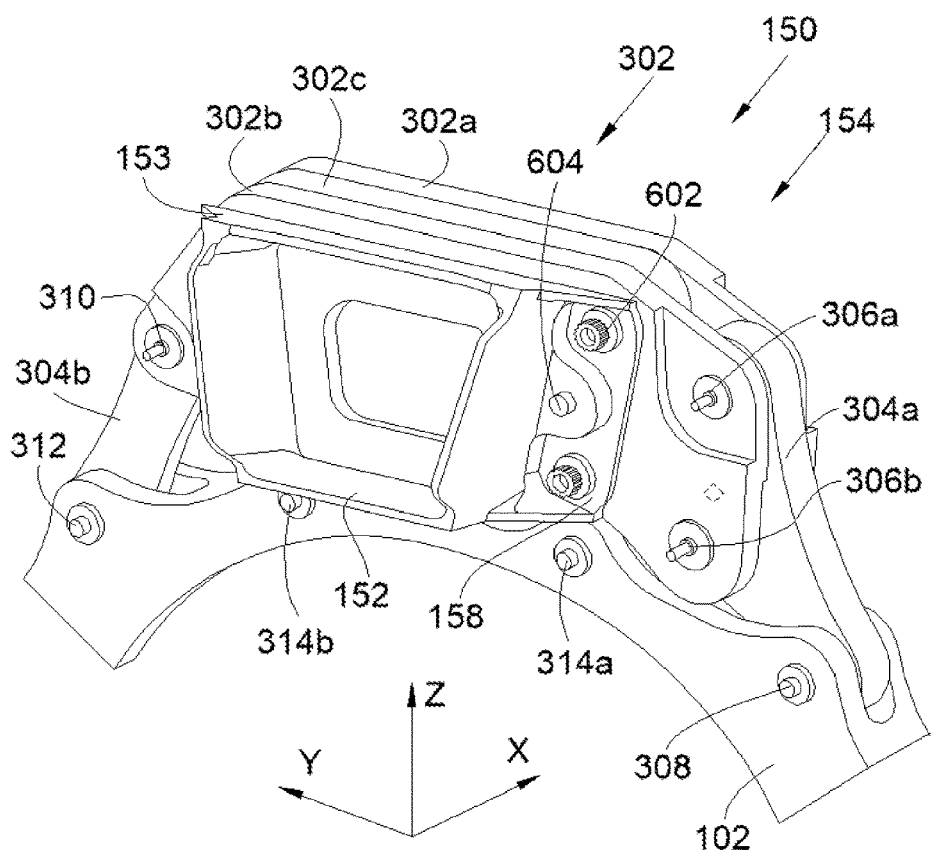
FIG. 2 is a perspective view of a front engine attachment system according to the invention.
Figure 3:
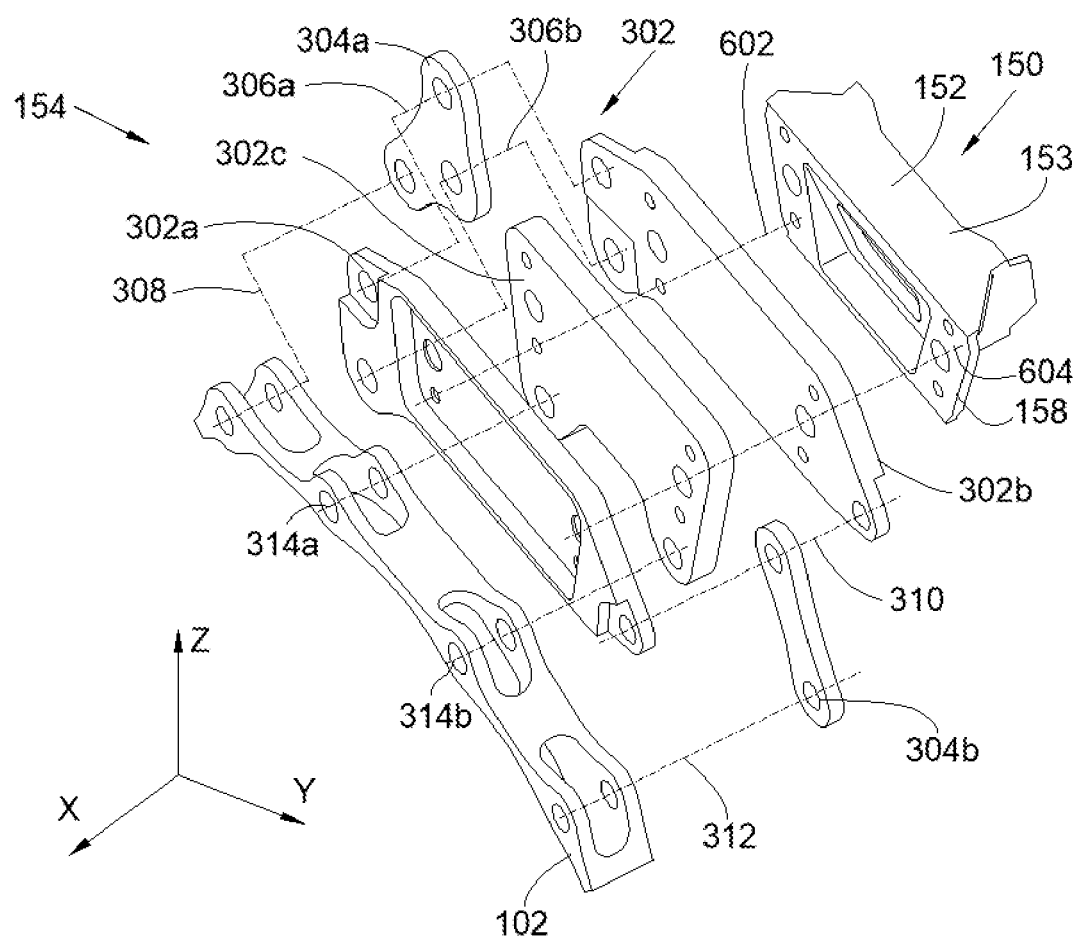
FIG. 3 is an exploded perspective view of the front engine attachment system in FIG. 2.

As shown in FIGS. 2 and 3, the front engine attachment system 150 comprises an engine pylon 152, which is fastened to the wing 103, and a front engine attachment 154, which is fastened to the engine pylon 152 and to which the front part of the engine 102 is fastened.

In a known manner, the engine pylon 152 takes for example the form of a box that has, inter alia, in its front part, a frontal part 153 that extends in a substantially vertical plane.

The front engine attachment 154 has a beam 302 to which a link rod 304a-b is fastened on either side of a median plane XZ.

Each link rod 304a-b is fastened to the beam 302 in an articulated manner by at least one first connection point 306a-b, 310, and is fastened to a front part of the engine 102, which is shown here by a part of its front casing, in an articulated manner by at least one second connection point 308, 312.

In the embodiment of the invention shown here, the frontal part 153 has an attachment wall 158 that has a front face oriented towards the front of the aircraft 100.

The beam 302 is fastened to the front face of the attachment wall 158, in this case using bolts 602 that pass through a bore in the beam 302 and a bore in the attachment wall 158.

The front engine attachment system 150 also has in this case shear pins 604 that pass through a bore in the beam 302 and a bore in the attachment wall 158.

In the embodiment of the invention shown here, the first link rod 304a is fastened to the beam 302 by two first connection points 306a-b and to the engine 102 by a second connection point 308, and the second link rod 304b is fastened to the beam 302 by a first connection point 310 and to the engine 102 by a second connection point 312.

For each link rod 304a-b, each connection point to the beam 302 and to the engine 102 is made up of a clevis created, in the beam 302 and the engine 102, respectively, by a bore passing through the link rod 304a-b and by a pin that passes through bores in the clevis and fits into the bore in the link rod, wherein the link rod is mounted on the pin via a ball joint.

Each link rod 304a-b, the beam 302 and the frontal part 153 define, in combination, a primary load path between the engine 102 and the engine pylon 152, so as to withstand the loads of the engine 102 under normal operating conditions of the engine 102.

For increased safety, the front engine attachment 150, and more specifically the beam 302, has, for each link rod 304a-b, an additional connection point 314a-b. The additional connection points 314a-b are disposed on either side of the median plane XZ, and each establish an additional connection between the beam 302 and the engine 102. Each additional connection point 314a-b takes the form of a backup safety fastening point (or "waiting fail-safe") that will compensate for a failure of the primary load path, that is to say of at least one of the link rods 304a-b. This means that when a component of the primary load path is damaged, the activation of a backup safety fastening point creates an auxiliary load path between the engine 102 and the engine pylon 152.

Each backup safety fastening point 314a-b is, in this case, made up of a clevis provided in the engine 102 and a pin that is fitted into bores in the clevis and passes through a bore in the beam 302, the diameter of which is greater than the diameter of the pin. Thus, in normal operation there is no contact between the pin and the beam 302, and if one of the link rods 304a-b breaks, the engine 102 will move and the pin then comes into contact with the beam 302.

According to the invention, the beam 302 is made up of a front plate 302a, a rear plate 302b and an intermediate plate 302c that are fastened together in a removable manner. The front plate 302a is disposed in front of the rear plate 302b and the rear plate 302b is pressed against the front face of the attachment wall 158. The intermediate plate 302c is disposed between the front plate 302a and the rear plate 302b.

The front plate 302a, the intermediate plate 302c and the rear plate 302b each extend in a plane parallel to the front face of the attachment wall 158 and are fastened to the attachment wall 158 by the series of bolts 602.

The production of the beam 302 from three plates 302a-c makes it easier to produce the beam 302 since the three plates 302a-c are effectively easier to produce, in particular since their thickness is smaller than the beam of the prior art.

The beam 302 is fastened to the front face of the attachment wall 158, in this case using bolts 602 that pass through a bore in the beam 302 and a bore in the attachment wall 158. In the embodiment of the invention that is presented here, there is a pair of bolts 602 disposed on the port side and a pair of bolts 602 installed on the starboard side, and each bolt 602 passes through a bore in the attachment wall 158, a bore in the rear plate 302b, a bore in the intermediate plate 302c and a bore in the front plate 302a.

The front engine attachment system 150 also has in this case shear pins 604 that pass through a bore in the attachment wall 158, a bore in the rear plate 302b, a bore in the intermediate plate 302c and a bore in the front plate 302a.

As shown in FIG. 2, each link rod 304a-b is sandwiched between the front plate 302a and the rear plate 302b. This means that, for each link rod 304a-b, the front plate 302a and the rear plate 302b each have an extension that meets a face of the link rod 304a-b.

Thus, for each clevis created in the beam 302, one wall of the clevis is made up of an extension of the front plate 302a, and the other wall of the clevis is made up of an extension of the rear plate 302b.

For each backup safety fastening point 314a-b, the bore in the beam 302 is formed by a bore through the intermediate plate 302c.

For each of the clevises described above, the pin of the clevis is generally parallel to the longitudinal direction X.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A front engine attachment system configured to fix an engine of an aircraft, the front engine attachment system having:

an engine pylon having, in its front part, a frontal part having an attachment wall that has a front face, and a front engine attachment having a beam, which is fastened to the front face and to which a link rod is fastened on either side of a median plane, wherein each link rod is fastened to the beam in an articulated manner by at least one first connection point and is configured to be fastened to the engine in an articulated manner by at least one second connection point, wherein the beam is made up of a front plate, an intermediate plate and a rear plate, wherein the rear plate is pressed against the front face, wherein the front plate is disposed in front of the rear plate, and wherein the intermediate plate is disposed between the front plate and the rear plate, wherein each first connection point between the beam and a link rod is formed as a clevis created in the beam, wherein a first wall of said clevis is made up of an extension of the front plate, and wherein a second wall of said clevis is made up of an extension of the rear plate, wherein each link rod comprises a backup safety fastening point that is activated upon a failure of a primary load path and creates an auxiliary load path between the engine and the engine pylon, wherein each backup safety fastening point is made up of a clevis provided in the engine and a pin that is fitted into bores in said clevis and passes through a bore in the beam, a diameter of which is greater than a diameter of the pin, wherein the bore in the beam is formed by a bore through the intermediate plate, wherein the first link rod is fastened to the beam by two first connection points and to the engine by a second connection point, and the second link rod is fastened to the beam by a first connection point and to the engine by a second connection point, wherein the intermediate plate is connected at two connection points to the engine, and wherein the plates are in contact with each other.

2. The front engine attachment system according to claim 1, wherein the fastening of the beam to the front face of the attachment wall is undertaken with bolts, and wherein each bolt passes through a bore in the attachment wall, a bore in the rear plate, a bore in the intermediate plate and a bore in the front plate.

3. An aircraft having a structure, an engine and a front engine attachment system according to claim 1, wherein the engine pylon is fastened to the structure, and wherein a front part of the engine is fastened to said at least one second connection point.

\* \* \* \* \*